Figure 1:
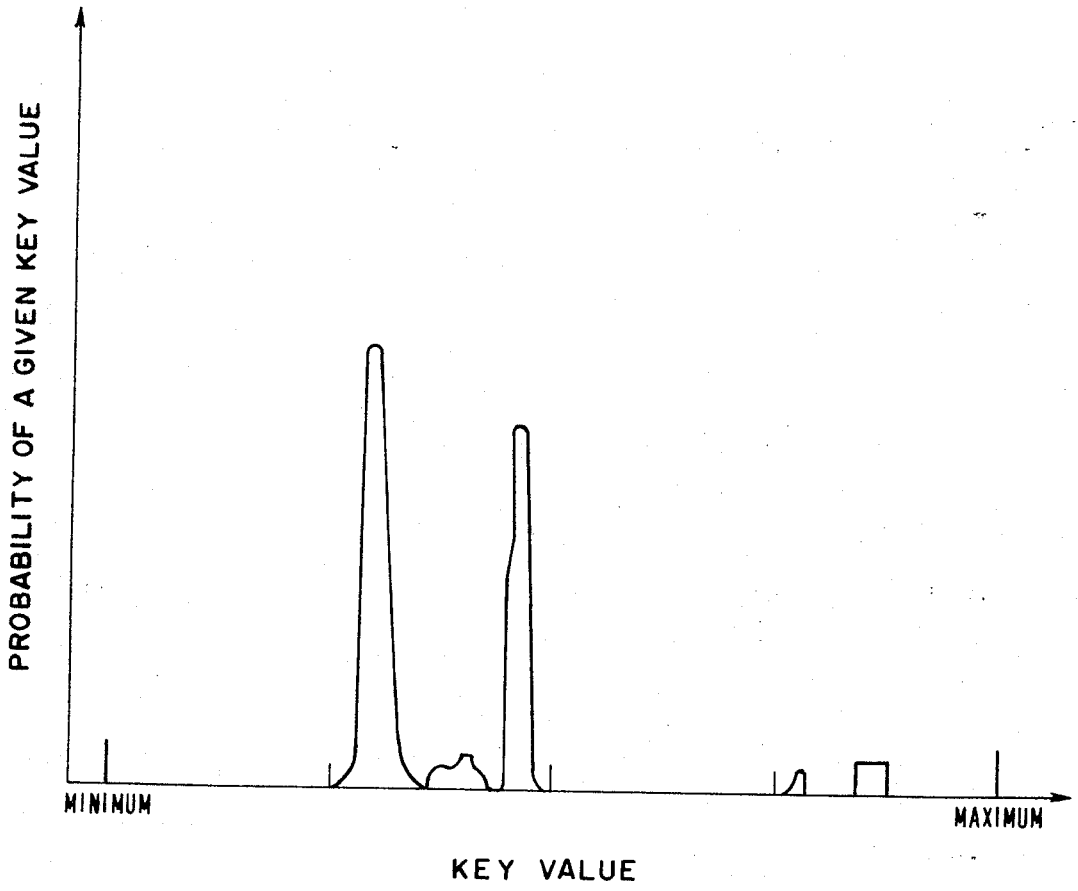
Figure 2:
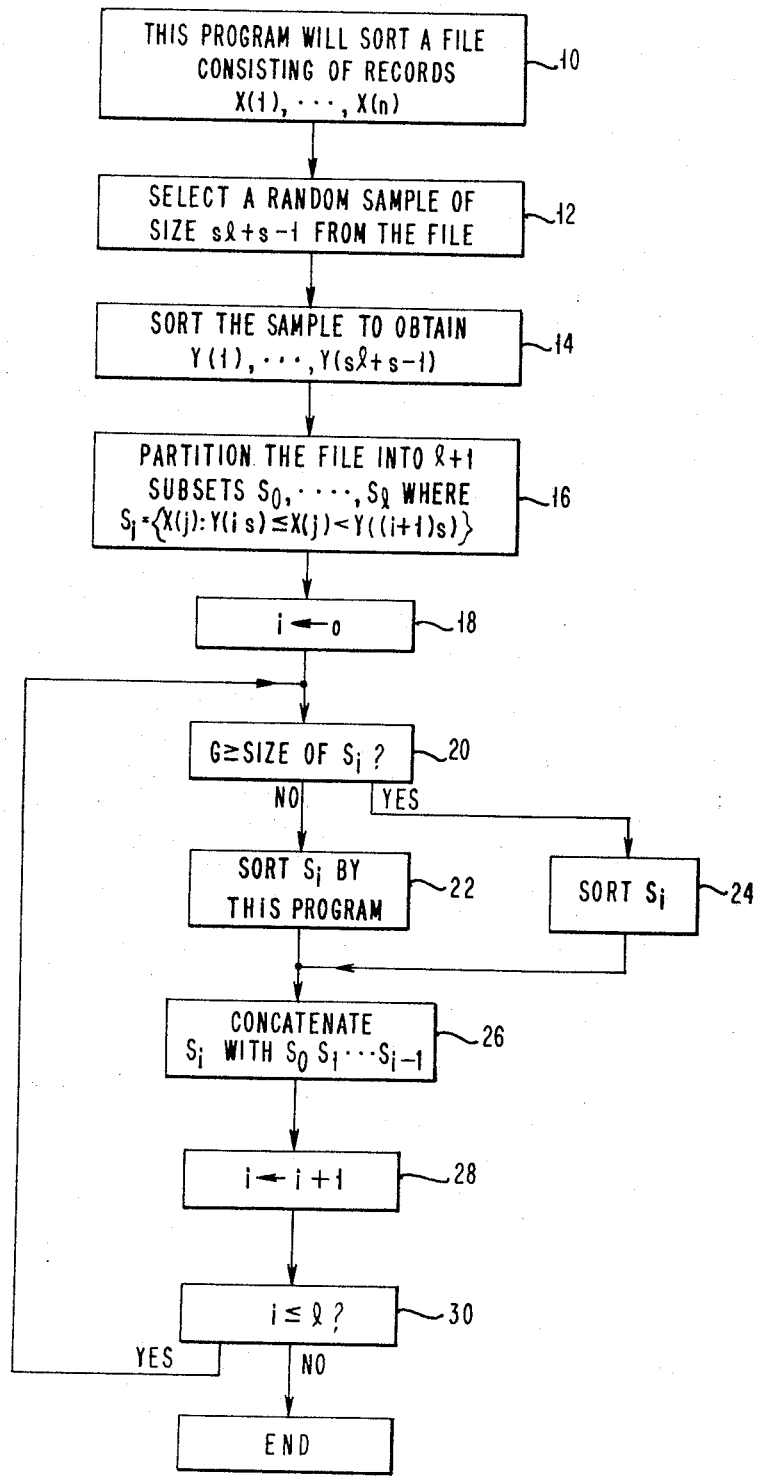
Figure 7:
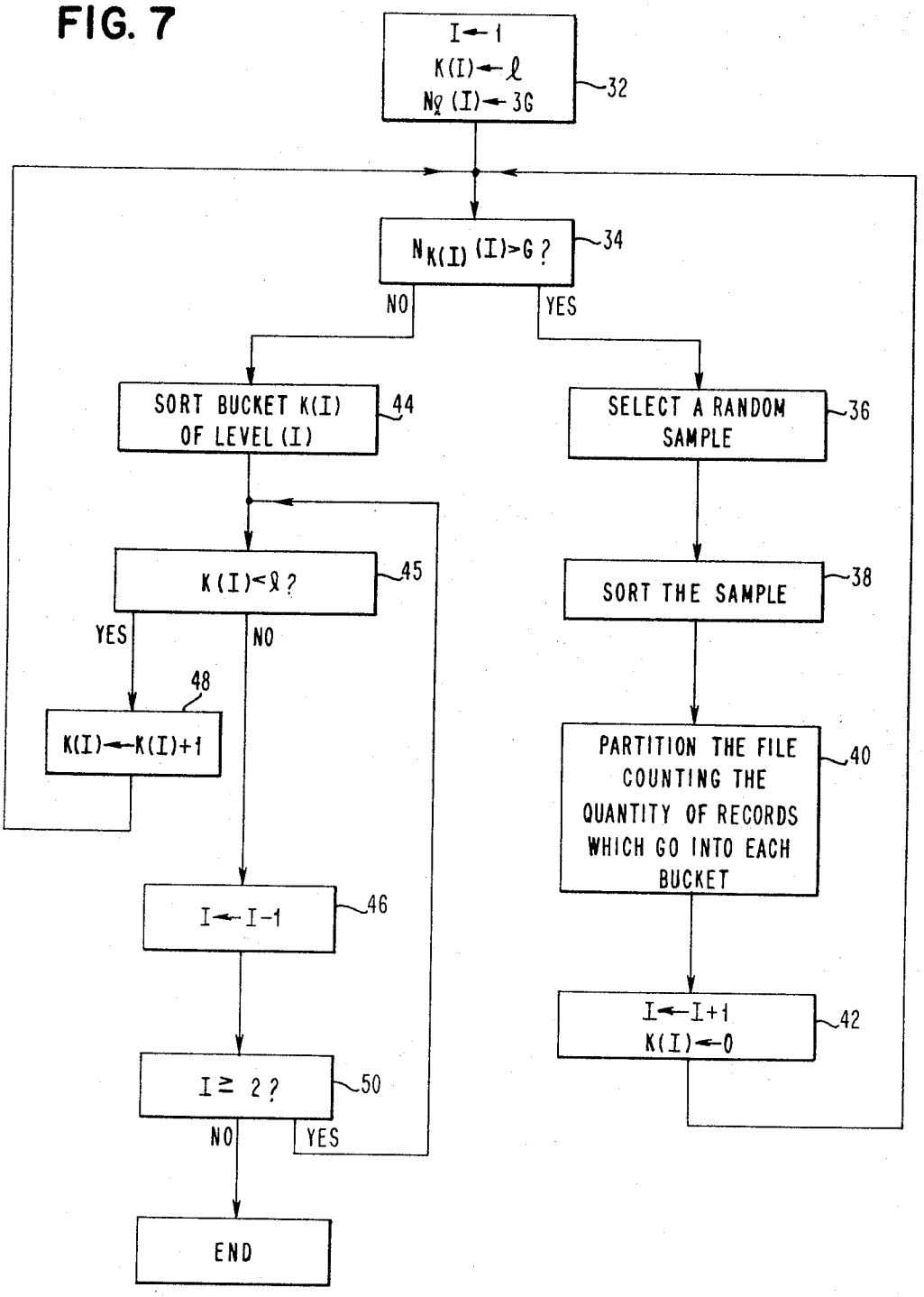
Figure 8:
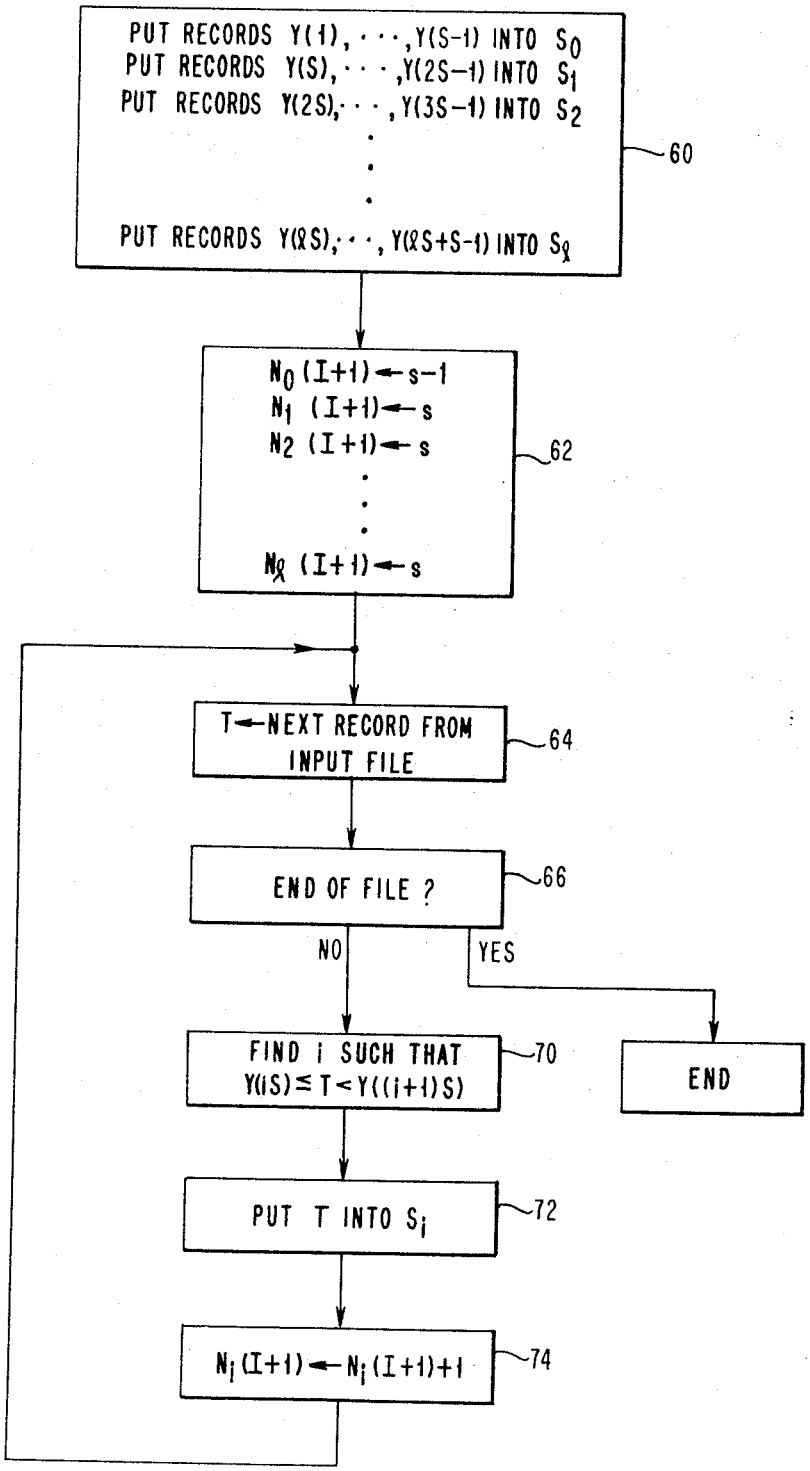
Figure 9:
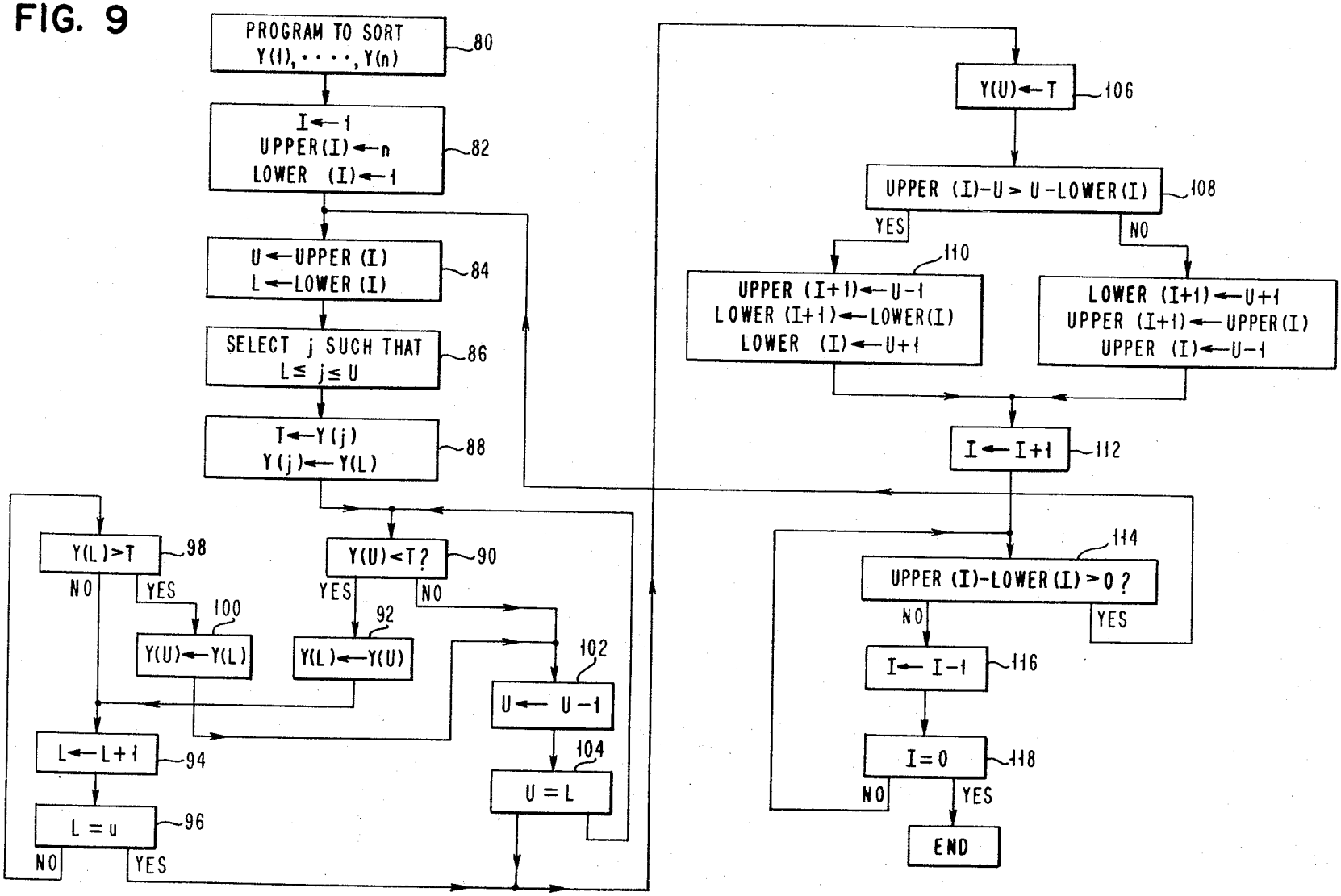
Figures 10A, 10B, 12:
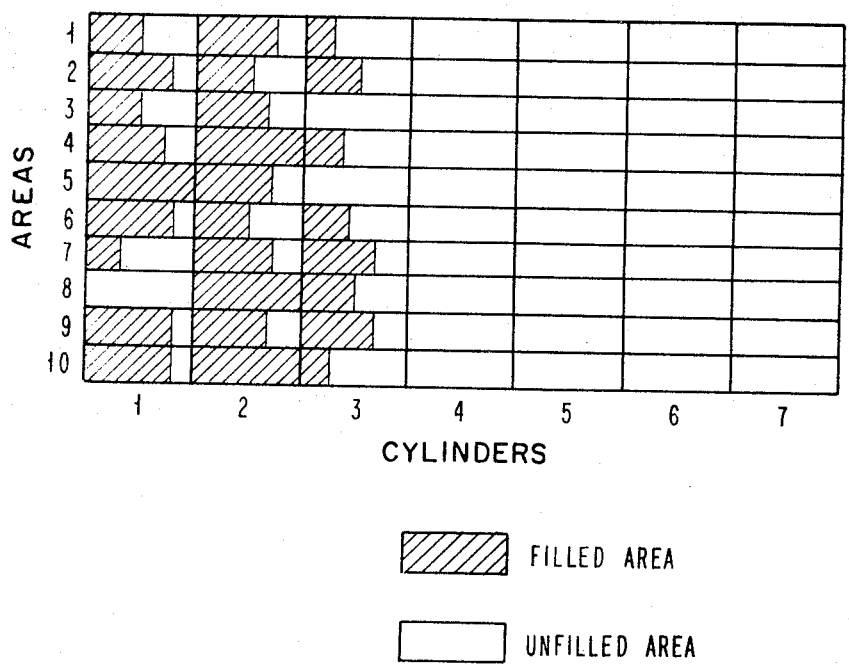
Figure 11:
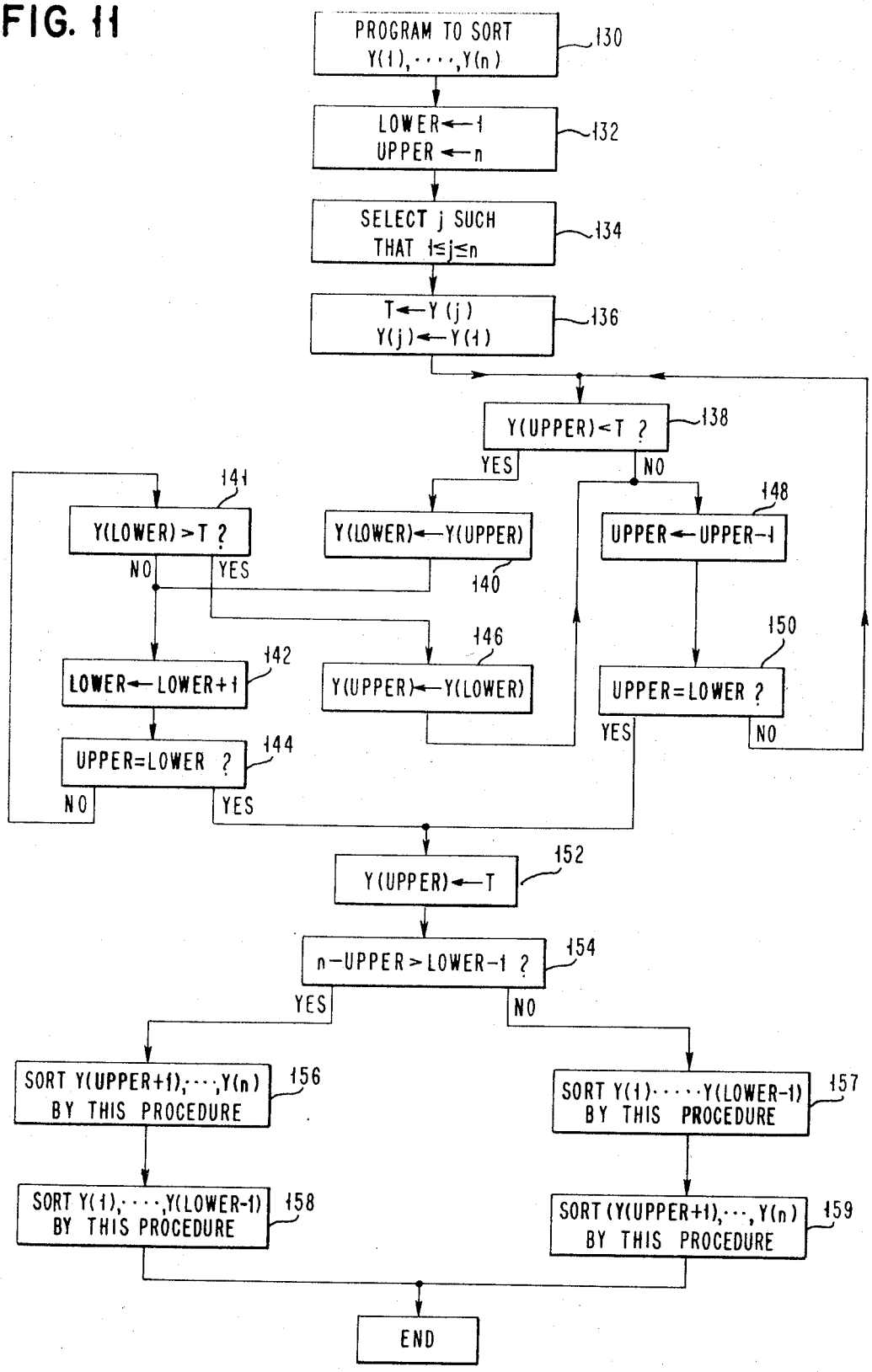

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 14, 1973

913 O.G. 393

T913,007
SORT PROCESS

Archie Charles McKellar, Mount Kisco, N.Y., assignor to International Business Machines Corporation, Armonk, N.Y.

Continuation of application Ser. No. 214,200, Dec. 30, 1971. This application Feb. 20, 1973, Ser. No. 333,920
Int. Cl. G06f *7/06, 7/22*
U.S. Cl. 444—1
8 Sheets Drawing. 25 Pages Specification

In the sort process disclosed herein, there is first selected a random sample of the records of a file to be sorted into an ordered sequence. This sample may suitably have the size $sl+s-1$ wherein $l+1$ is the quantity of subsets desired from a particular distribution pass and $s$ is a selectable parameter. The selected sample is sorted into an ordered sequence and the file is then partitioned in accordance with every $s$th key of the sorted sample into $l+1$ subsets. The records of each of the subsets are again partitioned into $l+1$ subsets as described above and this process is continued until the size of the subsets is small enough so that they can be conveniently sorted into respective ordered sequences, preferably employing a tree type sort. The ordered sequences are then concatenated to form the sorted file. The random sample may be provided, for example, by using a random number generator to generate integers in the range of 1 to $n$ wherein $n$ is the total quantity of records in the file until $sl+s-1$ distinct integers have been generated. The records at these integer addresses in the file can then be selected to constitute the sample.

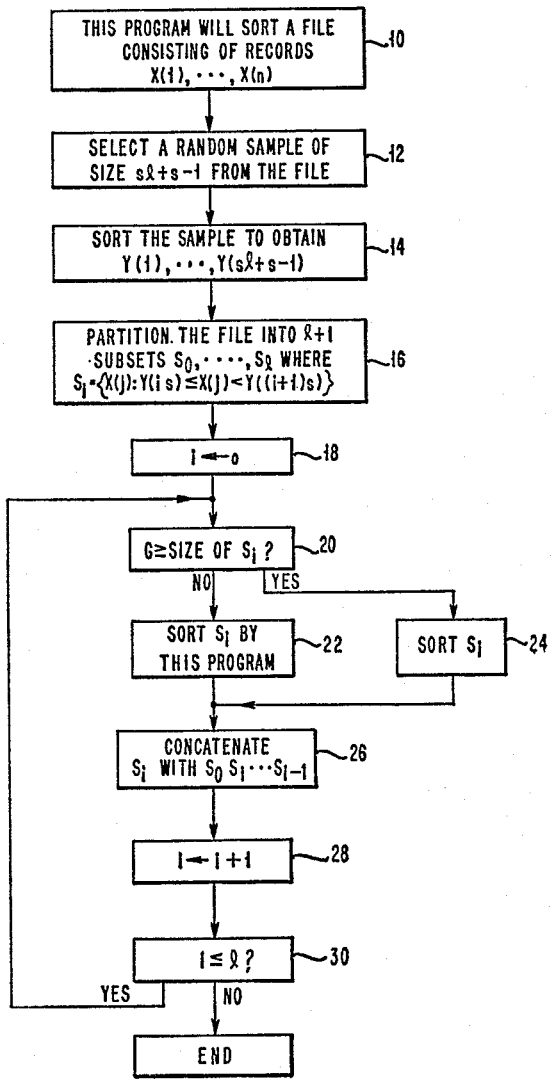

FIG. 3A
| ADDRESS | 1 | 2 | 3 | 4 | 5 | 6 | 7 | 8 | 9 | 10 | 11 |
|---|---|---|---|---|---|---|---|---|---|---|---|
| RECORD | 4 | 9 | 17 | 24 | 13 | 6 | 25 | 2 | 18 | 14 | 3 |
FIG. 3B
| ADDRESS | 1 | 2 | 3 | 4 | 5 | 6 | 7 | 8 | 9 | 10 | 11 |
|---|---|---|---|---|---|---|---|---|---|---|---|
| RECORD | 2 | 3 | 4 | 6 | 9 | 13 | 14 | 17 | 18 | 24 | 25 |
FIG. 4
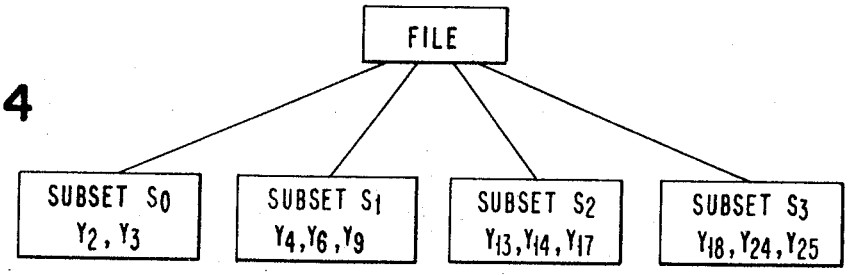
FIG. 5
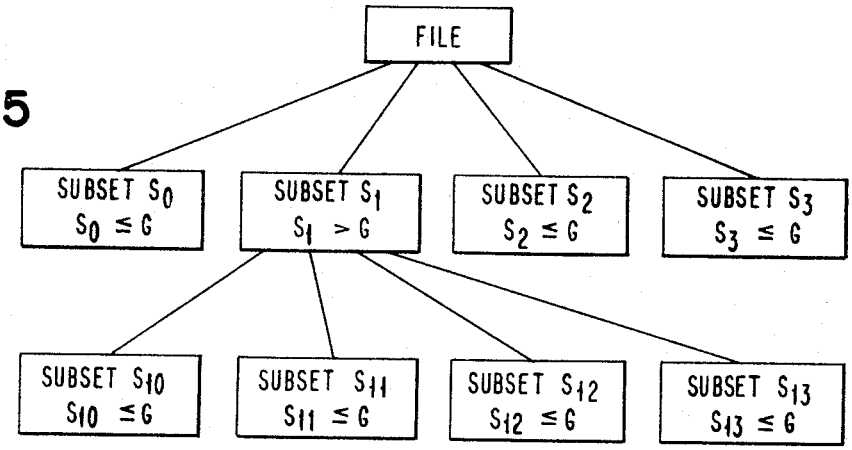
FIG. 6 $S_0$ $S_{10}$ $S_{11}$ $S_{12}$ $S_{13}$ $S_2$ $S_3$

SORT PROCESS

Original Filed Dec. 30, 1971 8 Sheets-Sheet 6

| | | | | | | | | | | | |
|---|---|---|---|---|---|---|---|---|---|---|---|
| | L | | | | | | | | | | U |
| ADDRESS | 1 | 2 | 3 | 4 | 5 | 6 | 7 | 8 | 9 | 10 | 11 |
| RECORD | 4 | 9 | 17 | 24 | 13 | 6 | 25 | 2 | 18 | 14 | 3 |

| | | | | | | | | | | | |
|---|---|---|---|---|---|---|---|---|---|---|---|
| | | | | L | | | | | | | |
| ADDRESS | 1 | 2 | 3 | 4 | 5 | 6 | 7 | 8 | 9 | 10 | 11 |
| RECORD | 3 | 2 | 4 | | 13 | 24 | 25 | 17 | 18 | 14 | 9 |
| | | | | U | | | | | | | |